(No Model.)
J. J. DEMPSEY.
ANGLING DEVICE.
No. 605,538. Patented June 14, 1898.
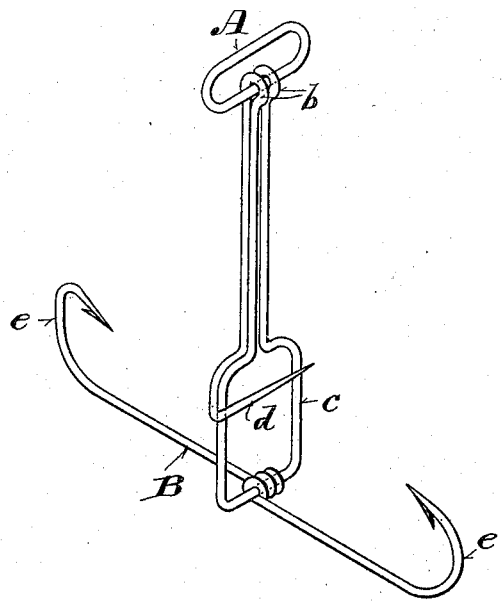

UNITED STATES PATENT OFFICE.

JAMES J. DEMPSEY, OF HARTFORD, WISCONSIN, ASSIGNOR OF ONE-HALF TO ADOLPH G. LAUBENSTEIN, OF SAME PLACE.

ANGLING DEVICE.

SPECIFICATION forming part of Letters Patent No. 605,538, dated June 14, 1898.

Application filed February 14, 1898. Serial No. 670,236. (No model.)

*To all whom it may concern:*

Be it known that I, JAMES J. DEMPSEY, a citizen of the United States, and a resident of Hartford, in the county of Washington and State of Wisconsin, have invented certain new and useful Improvements in Angling Devices; and I do hereby declare that the following is a full, clear, and exact description thereof.

My invention has for its object to improve the chances of an angler catching fish that attack his bait; and it consists in structural peculiarities of the simple economical combined bait-holder and double fish-hook herein set forth, with reference to the accompanying drawing and subsequently claimed.

The drawing represents a perspective view of an angling device in accordance with my invention.

Referring by letter to the drawing, A represents a line-attaching link of suitable length loose in eyes b, formed by bends of a spring-wire that is also shown bent to form a vertical loop c and a pin d, the latter being extended horizontally across the loop. The length of the wire intermediate of the eyes b and loop c is such as may be found most convenient or desirable in practice, and the lower portion of said loop constitutes a pivot for a shank B, having each end thereof in the form of an ordinary fish-hook e, and while the shank may be coiled, as herein shown, to constitute a pivot-eye other provision may be had for its pivotal connection with a loop-hanger.

The two-hook shank is balanced as near as may be on its pivot, and in practice there may be sufficient friction between said hook-shank and pivot to keep the former at right angles to its hanger until there is pull on one or the other of the hooks.

Live-minnow or other bait is impaled on the pin d to come within the loop c and extend in the direction of the shank B, clear of the hooks e, the loop c being spread to permit the impalement.

While I have shown and described the hook-hanger and bait-pin made from a single piece of suitably-bent spring-wire suspended from a link sufficiently long to permit of the loop portion of said hanger being spread, it is practical to omit the link and employ plural pieces of wire in the manufacture of the aforesaid hanger and pin, their union being effected in any suitable manner and provision had for sufficient clearance of the aforesaid pin when bait is to be impaled thereon.

It is to be understood that the hook-hanger and pin of my device combine to constitute a bait-holder.

If the above-described angling device be provided with an artificial bait, it will be practical to have the bait-pin fast at both ends to the loop.

In practice a fish attacking either end of the bait will at the same time engorge one of the hooks e, and as soon as there is pull on the device as a whole the fish will be caught by said hook, the shank of the latter tilting on its pivot to come in line with said hanger.

Having thus described my invention, what I claim as new, and desire to secure by Letters Patent, is—

1. An angling device comprising a hanger having a lower loop portion, a bait-pin crosswise of the loop, and a shank in pivotal connection with said loop having fish-hook terminals.

2. An angling device comprising a hanger having a lower loop portion, a pin crosswise of the loop but free at one end for impalement of bait when sufficient clearance is had, and a shank in pivotal connection with said loop having fish-hook terminals.

3. An angling device comprising a line-attaching link, a single wire bent to form link-engaging eyes, a loop and a bait-pin crosswise of the loop; together with a shank in pivotal connection with said loop having fish-hook terminals.

4. An angling device comprising a bait-holder, and a double fish-hook having pivotal connection with the bait-holder and extending in opposite directions therefrom.

In testimony that I claim the foregoing I have hereunto set my hand, at Hartford, in the county of Washington and State of Wisconsin, in the presence of two witnesses.

JAMES J. DEMPSEY.

Witnesses:
T. J. McCOLLOW,
J. C. RUSSELL.